E. G. VAN ZANDT.
GAS BURNER.
APPLICATION FILED NOV. 4, 1909.
Reissued Mar. 19, 1912.
13,387.
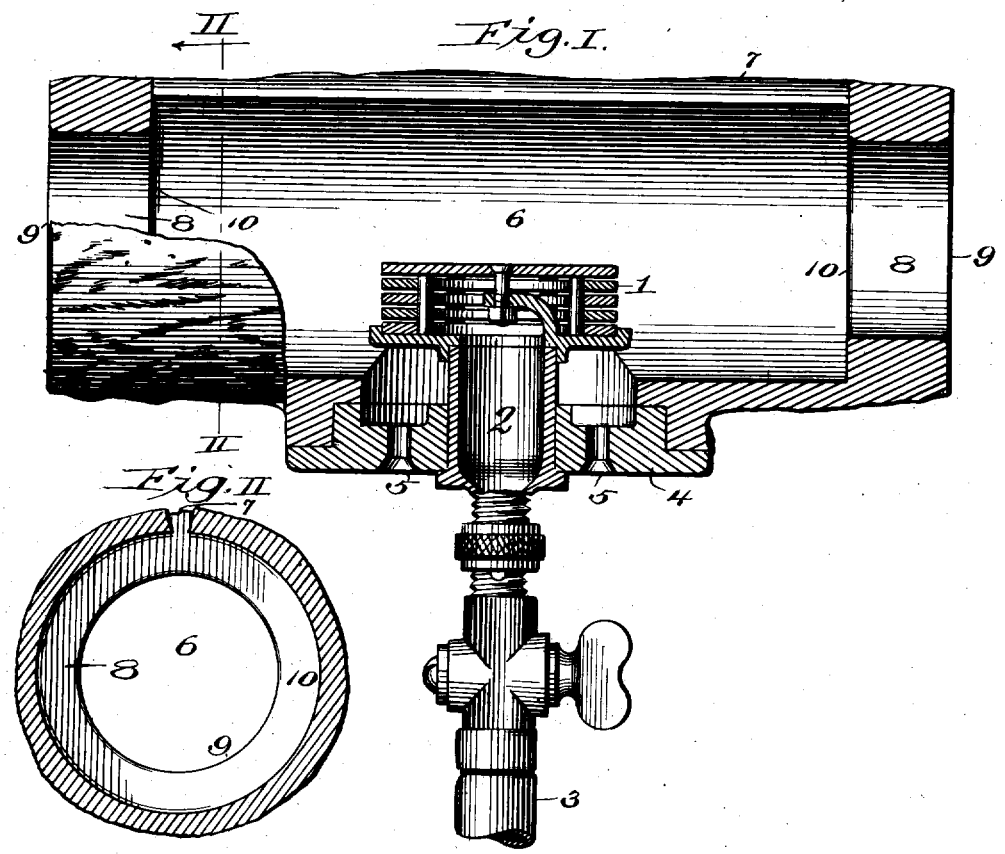
Witnesses
J. M. Fowler Jr.
J. Cook
Inventor
Edwin G. Van Zandt
By Goepel & Goepel
his Attorneys

UNITED STATES PATENT OFFICE.

EDWIN G. VAN ZANDT, OF ST. LOUIS, MISSOURI.

GAS-BURNER.

13,387. Specification of Reissued Letters Patent. Reissued Mar. 19, 1912.

Original No. 876,507, dated January 14, 1908, Serial No. 364,590. Application for reissue filed November 4, 1909. Serial No. 526,309.

*To all whom it may concern:*

Be it known that I, EDWIN G. VAN ZANDT, a citizen of the United States of America, residing in the city of St. Louis and State of Missouri, have invented certain new and useful Improvements in Gas-Burners, of which the following is a full, clear, and exact description, reference being had to the accompanying drawing, forming part of this specification.

My present invention is in the nature of an improvement upon the gas-burner shown and described in U. S. Letters Patent No. 838,596, issued to me December 18, 1906, and the present invention has for its object to so construct the shell of a burner that certain components of gas may be retained in said shell until consumed by combustion and other components of the gas may be restrained from rapid escape from the shell, but escape gradually therefrom in such manner as that the poisonous matter will be consumed by combustion at the exterior of the shell. The poisonous elements are thereby prevented from rapid dissipation in the atmosphere before they can be consumed.

Figure 1 is a vertical longitudinal section taken centrally through my burner, and Fig. 2 is a vertical cross-section taken on line II—II, Fig. 1.

1 designates an initial burner of any suitable construction that is supported by a neck 2 into which gas passes from the conducting pipe 3 to enter and escape from said initial burner.

4 is an air-inlet member surrounding the neck 2 and provided with air-admission ducts 5.

The parts thus far described are to be found in the patent hereinbefore mentioned and no invention *per se* is herein claimed for them.

6 designates the shell of my burner which is supported by the air-inlet member 4 and within which the initial burner is located. The shell is of tubular form and the channel therein extends horizontally. In the upper portion of the wall of the shell is a vent 7 having the form of a V-shaped slot, as shown in Fig. 2.

8 are internal circular flanges at the ends of the shell which serve to contract the channel of the shell at its ends for the purpose of producing restricted end-vents 9. The inner faces or shoulders 10 of the internal flanges are so disposed in the embodiment of the drawing that they are at the upper portion of the shell contiguous to the ends of the top-vent 7, as shown in Fig. 1.

In the practical use of my burner the gas to be consumed escapes from the initial burner 1 into the shell 6 and certain components of the gas are consumed by combustion in the chamber or channel of said shell. These components are those from which the heat is derived in the combustion of gas and they are confined in the shell-chamber, due to the top-vent 7 being a restricted one and the end-vents 9 being also restricted, as a consequence of which the elements in their outward movement away from the initial burner strike against the longitudinal wall of the shell and against the shoulders 10 of the internal flanges 8. The poisonous elements which are given off from the gas find gradual egress from the shell-chamber through the top-vent 7 and the end-vents 9, and due to the high degree of heat at which the shell is maintained by the combustion of gas in its chamber such elements are kept constantly ignited as they emerge through the top and end -vents and are completely consumed before there is any possibility of their being dissipated in the atmosphere.

I have shown in the drawing one embodiment of my invention, but I do not wish to limit myself to the form shown, since changes may be made therein without departing from the spirit of my invention.

I claim as my invention:

1. In a gas-burner, the combination of an initial burner and a surrounding elongated shell provided with restricted end openings, and with a burner opening at its upper part, the products of combustion from the initial burner being retained within the shell and burned at the exterior of the shell immediately at said burner opening.

2. In a gas-burner, the combination of an initial burner with a surrounding shell having flanges extending inwardly forming restricted lateral openings to the shell, and a burner opening at its upper part, the products of combustion from the initial burner being retained within the shell and burned at the exterior of the shell immediately at the burner opening.

3. In a gas-burner, a horizontally disposed cylindrical shell having a longitudinal top-vent of V-shaped cross-section and flanges forming restricted end-vents, and an initial burner within said shell, the area of the top-vent being restricted so that a part of the products of combustion is forced to pass out at the end-vents.

4. In a gas-burner, the combination of an initial burner, and a surrounding shell having end-vents constricted in respect to the shell, and a top-vent having outwardly-flaring sides, restricted whereby part of the products of combustion is caused to pass through the end-vents, said initial burner being within the shell.

5. In a gas-burner having an initial burner, an inclosure surrounding the initial burner having a restricted top-vent, opening directly into the free air, and constricted lateral vents substantially in horizontal line with the initial burner, said top-vent being restricted so as to cause part of the products of combustion to pass through the lateral vents.

6. A gas-burner comprising an initial burner, and a shell surrounding the same and having at each end a single restricted end-vent, and having in the top-wall an elongated opening, said opening being restricted.

7. A gas-burner, comprising an initial burner, and a shell surrounding said initial burner having internal flanges at its ends providing restricted end-vents and having a V-shaped vent in the upper portion of its wall extending longitudinally of the shell and terminating at its internal flanges, substantially as set forth.

8. In a gas-burner, the combination of an initial burner and a shell surrounding it, having a restricted top-vent and constricted lateral vents, the former being at the uppermost part of the shell and free to the atmosphere, and air inlet openings at the bottom.

9. In a gas-burner, the combination of an initial burner and a horizontally arranged tubular shell surrounding said burner, said shell having a restricted top-vent and constricted vents at either end, the former being at the uppermost part of the shell and free to the atmosphere, and air inlet openings at the bottom.

10. In a gas-burner, the combination of an inner initial burner and an outer shell surrounding said initial burner and provided with a restricted top vent and restricted lateral vents below said top vent, said outer shell being operative to hold or retard gases unconsumed by said initial burner, and said top-vent permitting said unconsumed gases to escape from said shell directly to the outer air and serving as a burner orifice therefor.

EDWIN G. VAN ZANDT.

Witnesses:

FANNIE FISK,

C. P. GOEPEL.

Copies of this patent may be obtained for five cents each, by addressing the "Commissioner of Patents, Washington, D. C."